(12) United States Patent
Boone et al.

(10) Patent No.: US 9,767,435 B1
(45) Date of Patent: Sep. 19, 2017

(54) ENSURING THE ENTRY OF CERTAIN DATA IN A MATTER MANAGEMENT SYSTEM BY LEVERAGING ANOTHER PROCESS

(75) Inventors: Richard D. Boone, Kirkland, WA (US); Thomas G. Melling, Sammamish, WA (US); Ronald G. Wencel, Frankfort, IL (US); Gregory P. Shriber, Issaquah, WA (US)

(73) Assignee: Thomson Reuters Global Resources, Baar (CH)

( * ) Notice: Subject to any disclaimer, the term of this patent is extended or adjusted under 35 U.S.C. 154(b) by 962 days.

(21) Appl. No.: 11/415,361

(22) Filed: May 1, 2006

Related U.S. Application Data

(63) Continuation-in-part of application No. 10/864,290, filed on Jun. 9, 2004, now Pat. No. 7,617,154, and a continuation-in-part of application No. 10/923,606, filed on Aug. 20, 2004, which is a continuation-in-part of application No. 10/864,290, filed on Jun. 9, 2004, now Pat. No. 7,617,154.

(60) Provisional application No. 60/477,425, filed on Jun. 9, 2003, provisional application No. 60/497,247, filed on Aug. 22, 2003, provisional application No. 60/497,246, filed on Aug. 22, 2003.

(51) Int. Cl.
  *G06Q 10/10* (2012.01)
  *G06Q 10/06* (2012.01)

(52) U.S. Cl.
  CPC .......... *G06Q 10/101* (2013.01); *G06Q 10/06* (2013.01); *G06Q 10/0633* (2013.01); *G06Q 10/06316* (2013.01); *G06Q 10/10* (2013.01); *G06Q 10/103* (2013.01)

(58) Field of Classification Search
  CPC .... G06Q 10/10; G06Q 10/0633; G06Q 10/06; G06Q 10/06316; G06Q 10/101; G06Q 10/103
  USPC .............................. 705/1, 1.1, 301, 310, 311
  See application file for complete search history.

(56) References Cited

U.S. PATENT DOCUMENTS

| | | | | |
|---|---|---|---|---|
| 5,216,592 | A | * | 6/1993 | Mann et al. ...................... 705/8 |
| 5,765,140 | A | | 6/1998 | Knudson et al. |
| 5,893,905 | A | | 4/1999 | Main et al. |
| 5,907,490 | A | | 5/1999 | Oliver |
| 5,991,742 | A | | 11/1999 | Tran |
| 6,247,047 | B1 | | 6/2001 | Wolff |

(Continued)

OTHER PUBLICATIONS

DataCert Announces Availability of Cost Management and Workflow Tool; Web-Based Software Boosts ROI and Automates Invoice Management, Buisiness Editors & High-Tech/Legal Writers, Business Wire, New York: Jun. 21, 2002.*

(Continued)

*Primary Examiner* — Carrie S Gilkey
(74) *Attorney, Agent, or Firm* — Norton Rose Fulbright US LLP

(57) ABSTRACT

A facility for collecting distinguished information relating to an engagement of a first organization by a second organization is described. The facility provides an interface usable by at least one user affiliated with the second organization to provide the distinguished information. Only after the interface is used by a user affiliated with the second organization to provide the distinguished information, the facility permits at least one user affiliated with the second organization to perform a distinguished process.

21 Claims, 20 Drawing Sheets

(56) References Cited

U.S. PATENT DOCUMENTS

| | | |
|---|---|---|
| 6,421,683 B1 | 7/2002 | Lamburt |
| 6,523,027 B1 | 2/2003 | Underwood |
| 6,550,057 B1 | 4/2003 | Bowman-Amuah |
| 6,601,233 B1 | 7/2003 | Underwood |
| 6,609,128 B1 | 8/2003 | Underwood |
| 6,629,081 B1 | 9/2003 | Cornelius et al. |
| 6,633,878 B1 | 10/2003 | Underwood |
| 6,697,824 B1 | 2/2004 | Bowman-Amuah |
| 6,804,785 B2 | 10/2004 | Steele et al. |
| 6,882,986 B1 | 4/2005 | Heinemann et al. |
| 7,013,290 B2 | 3/2006 | Ananian et al. |
| 7,249,059 B2 | 7/2007 | Dean et al. |
| 7,305,392 B1 | 12/2007 | Abrams et al. |
| 7,406,427 B1 | 7/2008 | Guyan et al. |
| 7,437,327 B2 | 10/2008 | Lam et al. |
| 7,617,154 B1 | 11/2009 | Melling et al. |
| 7,689,482 B2 | 3/2010 | Lam et al. |
| 7,693,759 B2 | 4/2010 | Alberti et al. |
| 7,707,055 B2 | 4/2010 | Behmoiras et al. |
| 8,108,428 B1 | 1/2012 | Wencel et al. |
| 8,121,908 B2 | 2/2012 | Oney et al. |
| 8,140,691 B2 | 3/2012 | Kogan et al. |
| 8,280,812 B1 | 10/2012 | Melling et al. |
| 2001/0032170 A1 | 10/2001 | Sheth |
| 2001/0042032 A1 | 11/2001 | Crawshaw et al. |
| 2002/0023030 A1 | 2/2002 | Prohaska et al. |
| 2002/0040352 A1 | 4/2002 | McCormick |
| 2002/0046147 A1* | 4/2002 | Livesay et al. ............... 705/37 |
| 2002/0049751 A1 | 4/2002 | Chen et al. |
| 2002/0099577 A1 | 7/2002 | Black |
| 2002/0111824 A1* | 8/2002 | Grainger ............... 705/1 |
| 2002/0111897 A1 | 8/2002 | Davis |
| 2002/0112186 A1 | 8/2002 | Ford et al. |
| 2002/0129106 A1 | 9/2002 | Gutfreund |
| 2002/0138449 A1* | 9/2002 | Kendall et al. ............... 705/75 |
| 2002/0143960 A1 | 10/2002 | Goren et al. |
| 2002/0156697 A1 | 10/2002 | Okuhara et al. |
| 2002/0173934 A1 | 11/2002 | Potenza |
| 2002/0178093 A1 | 11/2002 | Dean et al. |
| 2002/0194081 A1 | 12/2002 | Perkowski |
| 2002/0198791 A1 | 12/2002 | Perkowski |
| 2003/0018543 A1 | 1/2003 | Alger et al. |
| 2003/0028451 A1 | 2/2003 | Ananian |
| 2003/0033226 A1 | 2/2003 | Anderson |
| 2003/0046169 A1 | 3/2003 | Fraser et al. |
| 2003/0069839 A1 | 4/2003 | Whittington et al. |
| 2003/0074248 A1 | 4/2003 | Braud et al. |
| 2003/0097342 A1 | 5/2003 | Whittingtom |
| 2003/0144969 A1 | 7/2003 | Coyne |
| 2003/0149765 A1 | 8/2003 | Hubbard et al. |
| 2003/0188175 A1 | 10/2003 | Volk et al. |
| 2003/0212609 A1 | 11/2003 | Blair et al. |
| 2004/0019528 A1 | 1/2004 | Broussard et al. |
| 2004/0034578 A1 | 2/2004 | Oney et al. |
| 2004/0059628 A1 | 3/2004 | Parker et al. |
| 2004/0093302 A1 | 5/2004 | Baker et al. |
| 2004/0172588 A1 | 9/2004 | Mattaway |
| 2004/0215633 A1 | 10/2004 | Harris |
| 2004/0230523 A1 | 11/2004 | Johnson |
| 2004/0243483 A1 | 12/2004 | Baumann et al. |
| 2005/0027586 A1 | 2/2005 | Bacon et al. |
| 2005/0033598 A1 | 2/2005 | Knapp et al. |
| 2005/0049966 A1 | 3/2005 | Melling et al. |
| 2005/0132048 A1 | 6/2005 | Kogan et al. |
| 2005/0144125 A1 | 6/2005 | Erbey et al. |
| 2005/0203800 A1 | 9/2005 | Sweeney et al. |
| 2005/0203814 A1 | 9/2005 | Derry et al. |
| 2005/0278232 A1 | 12/2005 | Bruffey et al. |
| 2007/0061260 A1 | 3/2007 | deGroeve et al. |

OTHER PUBLICATIONS

Non-Final Office Action for U.S. Appl. No. 11/001,630, Mail Date Jan. 21, 2010, 26 pages.

DataCert Announces Availability of Cost Management and Workflow Tool; Web-Based Software Boosts ROI and Automates Invoice Management, Business Editors & High-Tech/Legal Writers, Business Wire, New York: Jun. 21, 2002, p. 1, 3 pages.

Notice of Allowance for U.S. Appl. No. 10/864,290, Mail Date Jun. 29, 2009, 23 pages.

Final Office Action for U.S. Appl. No. 11/001,630, Mail Date Aug. 5, 2009, 21 pages.

Non-Final Office Action for U.S. Appl. No. 10/923,606, Mail Date Aug. 3, 2009, 31 pages.

U.S. Appl. No. 10/864,290, filed Jun. 9, 2004, Melling et al.
U.S. Appl. No. 11/001,630, filed Nov. 30, 2004, Wencel et al.
U.S. Appl. No. 11/847,258, filed Aug. 29, 2007, Melling et al.
U.S. Appl. No. 12/566,468, filed Sep. 24, 2009, Melling et al.

Final Office Action for U.S. Appl. No. 10/923,606, Mail Date Apr. 1, 2010, 36 pages.

Final Office Action for U.S. Appl. No. 11/001,630, Mail Date Jul. 9, 2010, 22 pages.

Non-Final Office Action for U.S. Appl. No. 12/566,468, Mail Date Oct. 12, 2011, 17 pages.

Notice of Allowance for U.S. Appl. No. 11/001,630, Mail Date Sep. 27, 2011, 14 pages.

U.S. Appl. No. 13/348,289, filed Jan. 11, 2012, Wencel et al.
U.S. Appl. No. 13/632,760, filed Oct. 1, 2012, Melling et al.

Non-Final Office Action for U.S. Appl. No. 10/864,290, Mail Date Dec. 27, 2007, 19 pages.

Non-Final Office Action for U.S. Appl. No. 10/923,606, Mail Date Jun. 11, 2008, 18 pages.

Non-Final Office Action for U.S. Appl. No. 10/864,290, Mail Date Jul. 9, 2008, 18 pages.

Non-Final Office Action for U.S. Appl. No. 11/001,630, Mail Date Nov. 14, 2008, 23 pages.

Non-Final Office Action for U.S. Appl. No. 10/923,606, Mail Date Dec. 17, 2008, 20 pages.

Non-Final Office Action for U.S. Appl. No. 10/864,290, Mail Date Jan. 6, 2009, 14 pages.

Notice of Allowance for U.S. Appl. No. 12/566,468, Mail Date May 25, 2012, 17 pages.

Non-Final Office Action for U.S. Appl. No. 13/348,289, Mail Date Oct. 26, 2012, 21 pages.

Non-Final Office Action for U.S. Appl. No. 11/847,258, Mail Date Feb. 28, 2013, 18 pages.

Non-Final Office Action for U.S. Appl. No. 13/632,760, Mail Date Feb. 15, 2013, 14 pages.

Non-Final Office Action for U.S. Appl. No. 11/847,258, Mail Date Oct. 18, 2010, 22 pages.

Non-Final Office Action for U.S. Appl. No. 11/001,630, Mail Date Jan. 3, 2011, 23 pages.

Non-Final Office Action for U.S. Appl. No. 12/566,468, Mail Date Mar. 4, 2011, 28 pages.

Final Office Action for U.S. Appl. No. 11/847,258, Mail Date Apr. 14, 2011, 23 pages.

\* cited by examiner

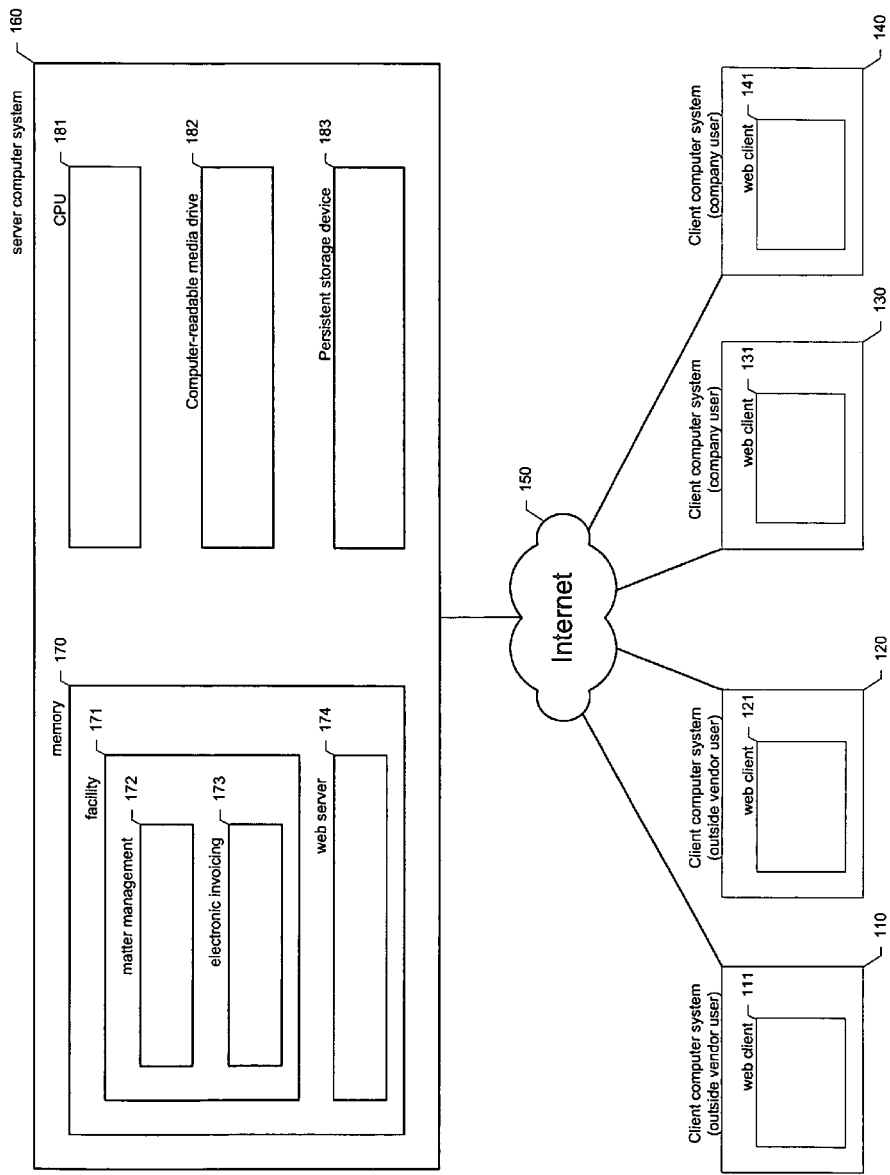
Figure 1 -- Ensuring the Entry of Certain Data In a Matter Management System at a Specified Time in the Future By Leveraging Another Process

| System Setup | | | |
|---|---|---|---|
| Edit Matter Category 210 | | | |
| Name: « Litigation | | | |
| Active: « ☑ 211 | | | |
| ▼ Field Options | | | |
| Use Company & Setup Information | Required Of | Date Required | Method to Require |
| 220 ☑ Full Matter Name/Parties Involved | ⊙ Lead Entity (Firm or Co.) ○ Co. Only ○ Not Required 233 | Required to create matter 240 | N/A |
| 220 ☑ Lead Company Person | ○ Lead Entity (Firm or Co.) ⊙ Co. Only ○ Not Required 233 | Required to create matter 240 | N/A |
| 220 ☑ Start Date | ○ Lead Entity (Firm or Co.) ⊙ Co. Only ○ Not Required 233 | Required to create matter 240 | N/A |
| 220 ☑ Matter Description | ○ Lead Entity (Firm or Co.) ⊙ Co. Only ○ Not Required 233 | Required to create matter 240 | N/A |
| 221 ☐ Case Summary for Audit Letter | ⊙ Lead Entity (Firm or Co.) ○ Co. Only ○ Not Required 231 | 60 days after service date 241 | submitting other data 252 250 |
| 221 ☑ Claims | ○ Lead Entity (Firm or Co.) ⊙ Co. Only ○ Not Required 230 | 0 days after matter creation | invoice approvals |
| 222 ☐ Key Issues | ○ Lead Entity (Firm or Co.) ⊙ Co. Only ○ Not Required 230 | 0 245 | 253 |
| 221 ☑ Trial Strategy Memo | ○ Lead Entity (Firm or Co.) ⊙ Co. Only ○ Not Required 230 | 90 days before trial date 244 | any co. data or process 252 |
| 221 ☑ Amount Claimed Against Company (Exposure) | ○ Lead Entity (Firm or Co.) ⊙ Co. Only ○ Not Required 230 | 10 days after notice of loss | submitting other data 251 |
| 221 ☑ Company Liability Estimate | ○ Lead Entity (Firm or Co.) ⊙ Co. Only ○ Not Required 232 | 90 days after matter creation 242 | invoice payment |
| 221 ☑ Description of Asset Exposure | ○ Lead Entity (Firm or Co.) ⊙ Co. Only ○ Not Required | 0 | |

200

Figure 2 – Ensuring the Entry of Certain Data In a Matter Management System at a Specified Time in the Future By Leveraging Another Process

_/— 300_

| New Matter - Create Profile | |
|---|---|
| LEGEND: « = Required to save form (hard required) |
| 310 —/ ‹ = Required prior to approving first invoice (soft required) |

▼ Company & Setup Information

Full Matter Name: «‹_ 320                    [                    ]  ❓

Short Matter Name: «‹_ 320                  [              ]  ❓

Lead Company Person: «‹_ 320    [Jeff T. Casemanager     ] [👤 Select...] ❓

2 Company Person: ‹_ 330       [                        ] [👤 Select...] ❓

Company File Number:            *Will be auto-assigned upon saving matter.* ❓

▼ Matter Information

Matter Category:                Filings > Patent Prosecution   ❓

Substantive law: ‹_ 330                                 [📘 Select...] ❓

Patent Title:                   [                              ] ❓

🕒 Required 5/13/2006 \_ 340

Figure 3 – Ensuring the Entry of Certain Data In a Matter Management System at a Specified Time in the Future By Leveraging Another Process

| Matter Profile | Status & Notes | Events & Diary | Budget | Invoices | Documents | Participants | ⟋ 400

Edit Matter Profile

LEGEND: « = Required to save form (hard required)
« = Required prior to approving first invoice (soft required)

▼ Company & Setup Information

Full Matter Name: «          Roadrunner License

Short Matter Name: «         Roadrunner License          ⑦

Lead Company Person: «       Jeff T. Casemanager    ⎮ Select... ⎮ ⑦
                             —410—

2 Company Person: «

Organizational Unit: «       Microsoft Internet Explorer                    ✖

Practice Group: «            ⟨?⟩   NOTICE - INCOMPLETE FIELD(S)

Company File Number:               The following "soft" required fields are incomplete:
                                       Patent Claim(s)
▼ Law Firm Information
                                   If you continue, you will need to complete these soft required
Lead Firm: «                       fields prior to approving any invoices for this matter.

Lead Outside Counsel: «            Click OK to continue, or CANCEL to return to the matter profile form.
                                   ⟋ 420
Lead Firm Fee Arrangement: «         ⎮ OK ⎮  ⎮ Cancel ⎮

Figure 4 -- Ensuring the Entry of Certain Data In a Matter Management System at a Specified Time in the Future By Leveraging Another Process

| | 512 | 516 | When | 523 | 524 | 525 |
|---|---|---|---|---|---|---|
| Field Name | In Use | Required of | Required | Trigger Event | Method to Require | Hard or Soft Required |
| 501 Full Matter Name | Yes - Locked | Co-Locked | 0-Locked | Required to create matter-Locked | N/A-Locked | Hard Required |
| 502 Lead Company Person | Yes - Locked | Co-Locked | 0-Locked | Required to create matter-Locked | N/A-Locked | Hard Required |
| 503 Start Date | Yes - Locked | Co-Locked | 0-Locked | Required to create matter-Locked | N/A-Locked | Hard Required |
| 504 Matter Description | Yes - Locked | Co-Locked | 0-Locked | Required to create matter-Locked | N/A-Locked | Hard Required |
| 505 Case Summary for Audit letter | Yes | Lead-Firm | 60 | days after service date | submitting other data | Soft Required |
| 506 Claims | Yes | Not Required | 0 | days after matter creation | invoice approvals | Soft Required |
| 507 Key Issues | No | Co | 0 | | | Soft Required |
| 508 Trial Strategy Memo | Yes | Co | 90 | days before trial date | any co. data or process | Soft Required |
| 509 Amount Claimed Against Company | Yes | Co | 10 | days after service date | submitting other data | Soft Required |
| 510 Company Liability Estimate | Yes | Co | 90 | days after matter creation | invoice payment | Soft Required |
| 511 | | | | | | |

Figure 5A -- Ensuring the Entry of Certain Data In a Matter Management System at a Specified Time in the Future By Leveraging Another Process

| Full Matter Name 554 | Matter Created Date 555 | Lead Company Person 556 | Service Date 557 | Matter Description 558 | Case Summary for Audit letter 559 | Claims 560 | Key Issues 561 | Trial Strategy Memo 562 | Trial Date 563 | Amount Claimed Against Company 564 | Company Liability Estimate 565 | All Required Fields Completed 566 |
|---|---|---|---|---|---|---|---|---|---|---|---|---|
| Georgie Porgie v. Acme 551 | 1/17/2005 | Jeff Casemanager | 1/17/2005 | On January 17, 2005, the Green Tree Arbor Association filed a claim in U.S. District Court asserting violation of the Environmental Protection Act, and various protected species laws, due to alleged demeaning activities (bad singing and dancing) of "Leafy the Environmentally Conscious Green Tree" mascot at Acme Inc.'s public relations events. Relief sought includes a preliminary injunction enjoining use of the tree, or other natural mascots, at all community events, a permanent injunction, and attorneys' fees. | Based on a review of the current facts and circumstances with counsel, management has provided for what is believed to be a reasonable estimate of the loss exposure for this matter. | 567 | 568 | 569 | 11/7/2008 | $1,000,000 | $500,000 | Yes 577 |
| Arbor Association v. Acme 552 | 12/12/2005 | Sally Manaager | 12/12/2005 | On December 12, 2005, plaintiff filed a class action lawsuit against Acme Inc. alledging gender discrimination in the company's hiring and promotion policies. | As of this January 15, 2006, the Company is still in the process of reviewing the plaintiff's allegation and as such no provision has been recorded for it. | 570 | 571 | 572 | 12/2/2008 | $15,000,000 | | No 576 578 |
| Wile E. Coyote v. Acme Explosives 553 | 10/31/2004 | Tracey Walker | 10/31/2004 | On October 31, 2004, plaintiff construction company filed its action in county court seeking replacement and rental costs arising out of down time from Acme fuzes and blasters that failed after two weeks of initial service. | Based on a review of the current facts and circumstances with counsel, management has provided for what is believed to be a reasonable estimate of the loss exposure for this matter. | 573 | 574 | 575 | 6/1/2006 | $1,000,000 | $300,000 | No 579 |

Figure 5B – Ensuring the Entry of Certain Data In a Matter Management System at a Specified Time in the Future By Leveraging Another Process

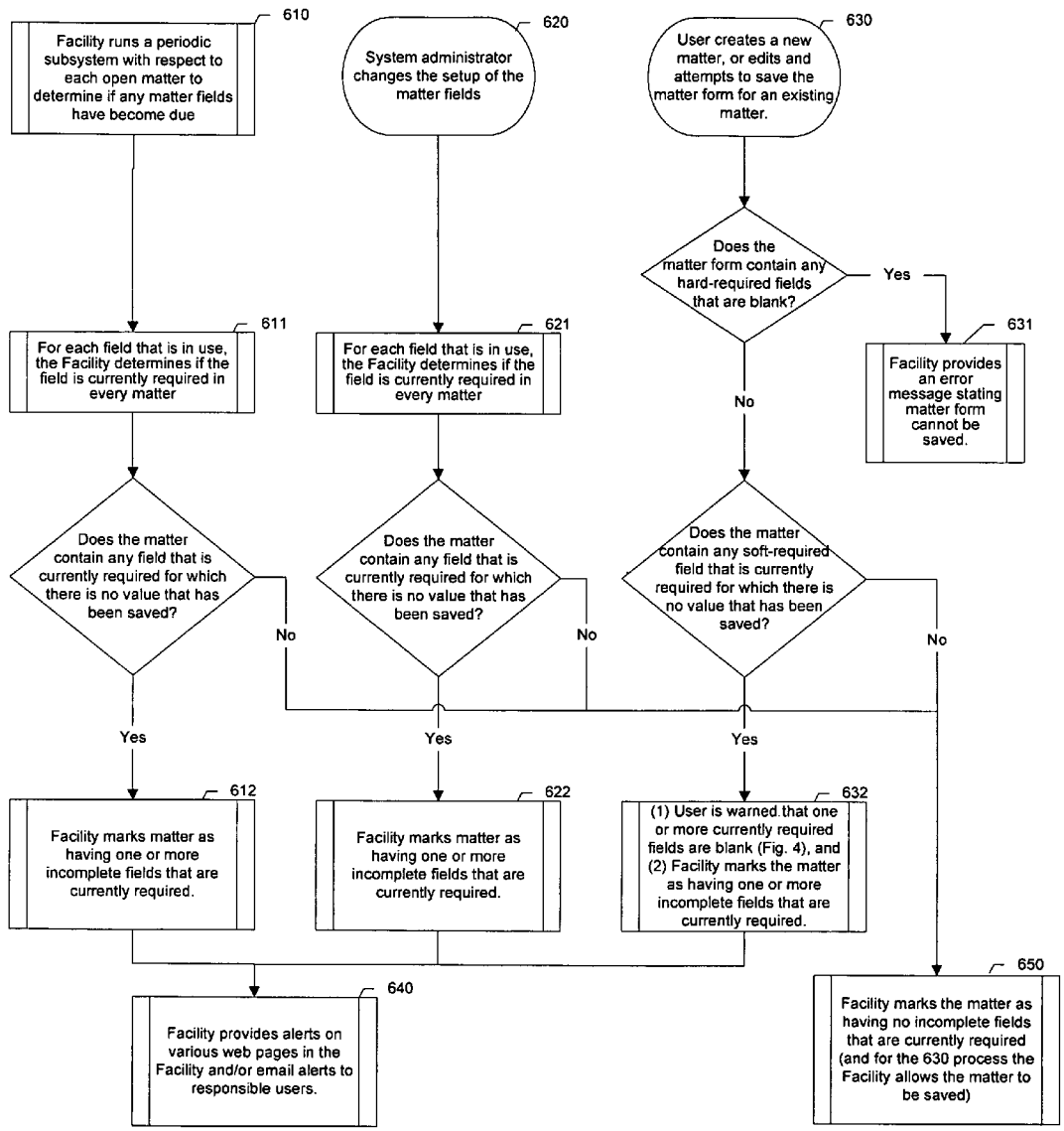
Figure 6 – Ensuring the Entry of Certain Data In a Matter Management System at a Specified Time in the Future By Leveraging Another Process

Figure 7 – Ensuring the Entry of Certain Data In a Matter Management System at a Specified Time in the Future By Leveraging Another Process

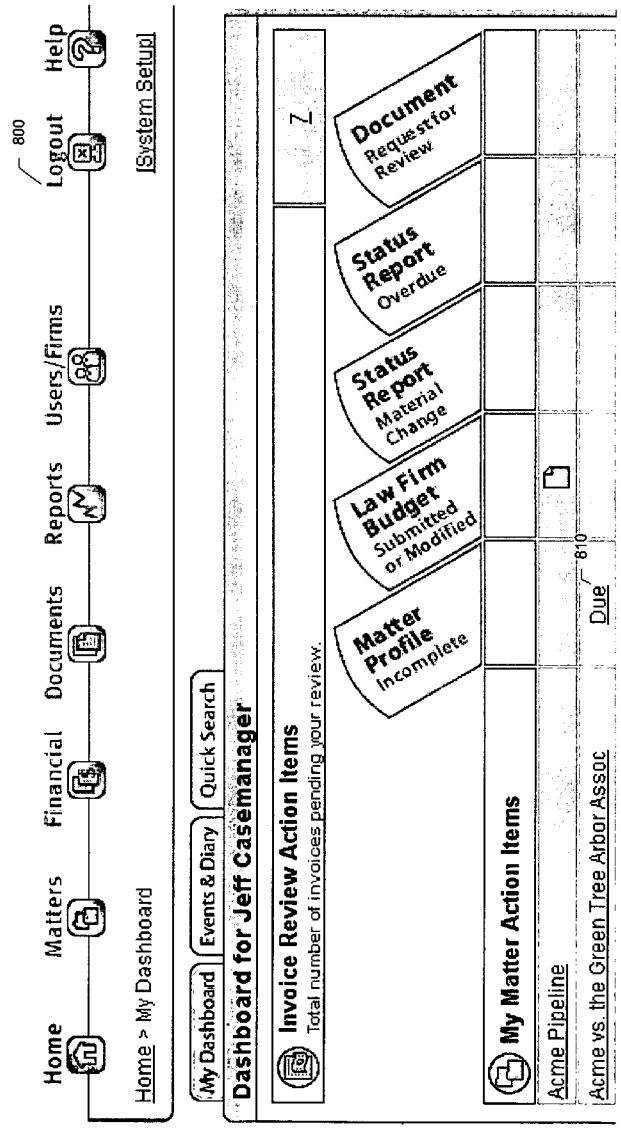
Figure 8 – Ensuring the Entry of Certain Data In a Matter Management System at a Specified Time in the Future By Leveraging Another Process Figure 9 – Ensuring the Entry of Certain Data In a Matter Management System at a Specified Time in the Future By Leveraging Another Process

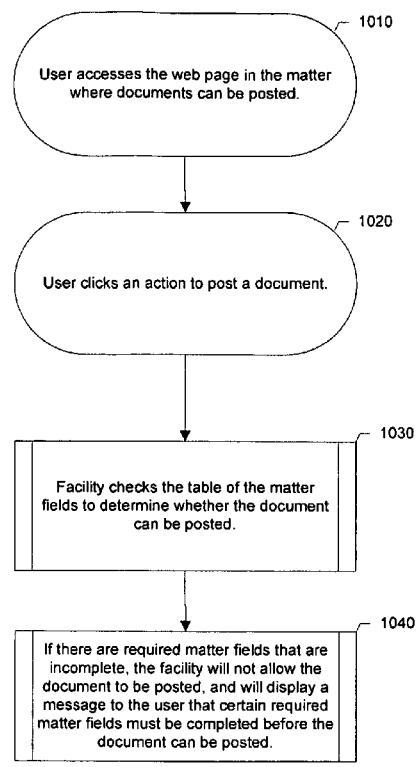
Figure 10 – Ensuring the Entry of Certain Data In a Matter Management System at a Specified Time in the Future By Leveraging Another Process Figure 11 – Ensuring the Entry of Certain Data In a Matter Management System at a Specified Time in the Future By Leveraging Another Process

Figure 11:
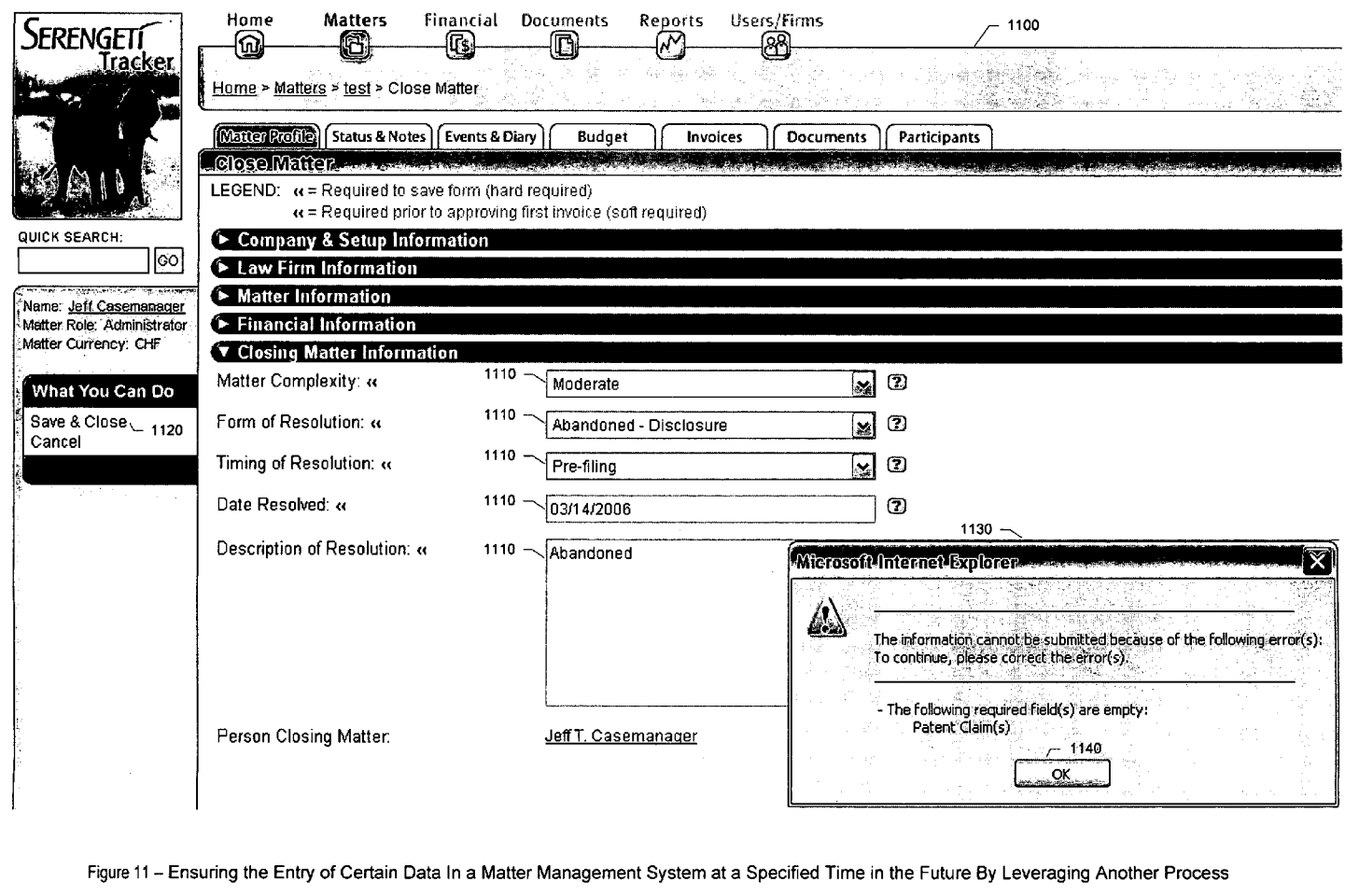

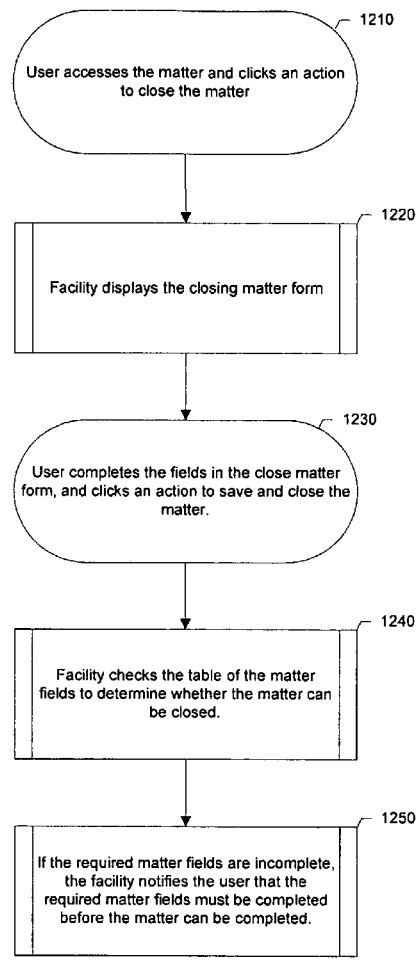
Figure 12 – Ensuring the Entry of Certain Data In a Matter Management System at a Specified Time in the Future By Leveraging Another Process

| Pending Inv. | Inv. AP Extract | Co. Bdgt | Co. Bdgt Admin |

Pending Invoices /— 1300

Save Changes & Submit Invoices /— 1350

▼ Pending Invoices - Without Adjustment

| Invoice # ▲ | Matter Name (Approval Status) | Submitted By (Firm Office) | Total (Adjusted) | Fees (Adjusted) | Expenses (Adjusted) | VAT Tax (Adjusted) |
|---|---|---|---|---|---|---|
| 1310 — 400001900 [📧] [upload marked] Next Approver: [view/edit] | 🔷 Roadrunner license /— 1315 Incomplete Task [details] /— 1340 /— 1330 AP Codes: [view/edit] | Shriber & Handy Seattle | $7,162.16 $7,162.16 €5,830.00 EUR €5,830.00 EUR | $6,756.75 $6,756.75 €5,500.00 €5,500.00 | $405.41 $405.41 €330.00 €330.00 | $0.00 $0.00 €0.00 €0.00 |
| 1310 — 5555 [📧] [upload marked] [download receipts] Next Approver: [view/edit] | 🔷 Coyote Corp. Transaction /— 1315 HOLD (save any change) ▼ /— 1320 AP Codes: [view/edit] | Shriber & Handy Seattle | $2,550.00 | $2,500.00 | $50.00 | $0.00 |
| 1310 — 70308 [📧] Next Approver: [view/edit] | 🔷 Baxter v. Acme /— 1315 HOLD (save any change) ▼ /— 1320 AP Codes: [view/edit] | Harper & McCord San Francisco | $499.31 | $475.00 | $24.31 | $0.00 |

Figure 13 -- Ensuring the Entry of Certain Data In a Matter Management System at a Specified Time in the Future By Leveraging Another Process

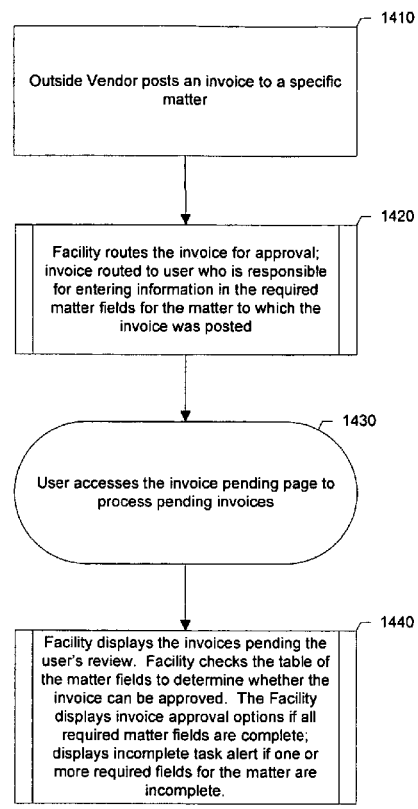
Figure 14 – Ensuring the Entry of Certain Data In a Matter Management System at a Specified Time in the Future By Leveraging Another Process

| Home | Matters | Invoices | Contracts | Reports | Admin | Logout | Hel |

Home > Matters > Matter Options

| Matter Profile | Status & Notes | Events & Diary | Budget | Invoices | Documents | Participants |

Matter Options

« indicates a required field

Matter Options ─ 1501

Internal or External Matter: «  ○ Internal (no law firm retained)
  ○ External (law firm(s) retained)

Matter Category: «  ○ Litigated/Disputed
  ○ Transactional/Other

Matter Is Private:  ☐ (Deny access by Delegates and Organizational Unit / Practice Group members)

Budgeting Options ─ 1510

Budget Type  ○ Monthly/Fiscal Year  ○ Phased ─ 1512
  ─ 1513              ─ 1514
Required Budget  ○ No  ○ Yes  Require after [   ] days
  ─ 1515              ─ 1516
Require End of Year Accrual  ○ No  ○ Yes  Require [   ] days before end of fiscal year

Status Report Options ─ 1530
                                              ─ 1532              ─ 1533
Require Status Reports:  ○ No  ○ Monthly  ○ Quarterly  Require after [   ] days
                    ─ 1534              ─ 1535
Case Assessment:  ○ No  ○ Yes  Require after [   ] days
              ─ 1536                          ─ 1537
Trial Assessment:  ○ No  ○ Yes  Require [   ] days before trial/arbitration
          ─ 1538                                  ─ 1541
Display & Confirm:  ☐ Budget          ☐ Case Summary
                              ─ 1539
  ☐ Estimates Exposure/ReCovery
                  ─ 1540
  ☐ Date/Phase Resolution
            ─ 1542                    ─ 1543
  Require after [   ] days   Require on the date [   ]
                                              ─ 1544
Require of:  ○ Law firm  ○ Company  ○ Law firm and company
Responsible Outside Vendor ─ 1550    ─ 1552
Lead Firm:  Baker & Roberts
                          ─ 1551
Lead Outside Counsel: «  [Lawyer, Olivia]  [Select...]

Figure 15 — Ensuring The Accurateness And Currentness Of Information Provided By The Submitter Of An Electronic Invoice Throughout The Life Of A Matter

Figure 16 -- Ensuring The Accurateness And Currentness Of Information Provided By
The Submitter Of An Electronic Invoice Throughout The Life Of A Matter

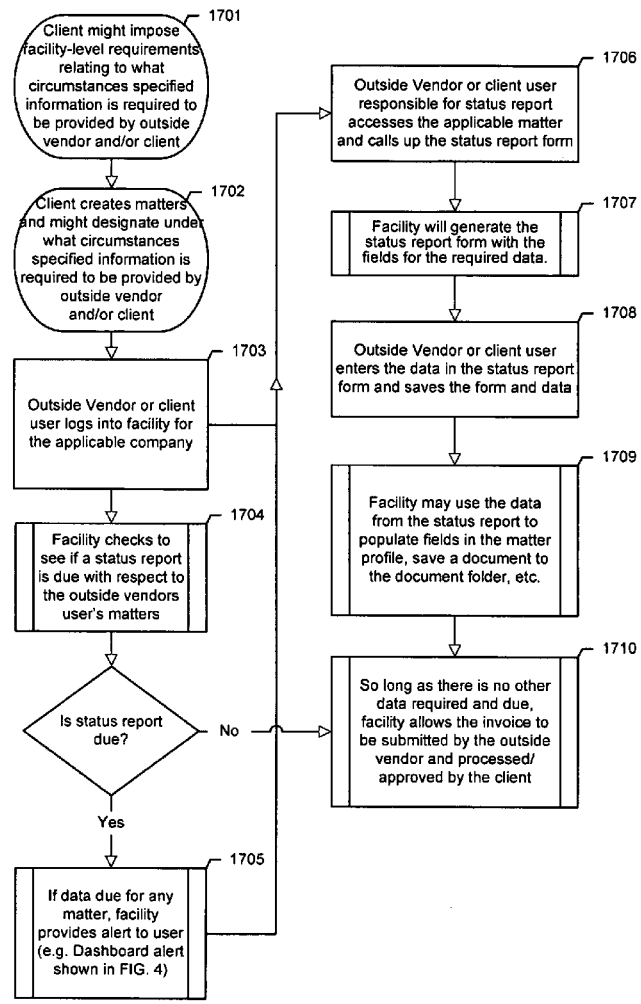
Figure 17 – Ensuring The Accurateness And Currentness Of Information Provided By
The Submitter Of An Electronic Invoice Throughout The Life Of A Matter

/— 1800

Prior Status Report - Lawyer, Greg 05/01/2004
Opposing counsel indicated on 11-20-2001 they are amending the complaint to allege fraud and seek punitive damages.

Current Status Report - Lawyer, Greg 06/01/2004
☐ No change from prior status report  /— 1810

Matter Status:  /— 1810

Have there been any developments that materially affect the fees, expenses, duration or outcome of this matter?
○ Yes  ● No
└ 1810

Budget Spreadsheet  /— 1820
Estimated Total Fees and Expenses (Total Matter Budget): $

| | FY 2004 Totals | $0.00 | $0.00 | $0.00 | |
|---|---|---|---|---|---|
| Month | Total | Fees | Expenses | Description of Budgeted Activities | |
| June 2004 | -- | $ /—1830 | $ /—1831 | /—1832 | |
| July 2004 | -- | $ /—1830 | $ /—1831 | /—1832 | |
| August 2004 | -- | $ /—1830 | $ /—1831 | /—1832 | |
| September 2004 | -- | $ /—1830 | $ /—1831 | /—1832 | |
| October 2004 | -- | $ /—1830 | $ /—1831 | /—1832 | |
| November 2004 | -- | $ /—1830 | $ /—1831 | /—1832 | |
| December 2004 | -- | $ /—1830 | $ /—1831 | /—1832 | |

Figure 18A -- Ensuring The Accurateness And Currentness Of Information Provided By
The Submitter Of An Electronic Invoice Throughout The Life Of A Matter

Prior Status Report - Lawyer, Greg 05/01/2004

Opposing counsel indicated on 11-20-2001 they are amending the complaint to allege fraud and seek punitive damages.

Current Status Report - Lawyer, Greg 06/01/2004

☐ No change from prior status report

Matter Status:

Matter Estimates

| | | |
|---|---|---|
| Estimate of Exposure: « | $ | 75,000.00 |
| Estimate of Maximum Potential Exposure: « | $ | |
| Estimate of Recovery: « | $ | 2,500.00 |
| Estimate of Maximum Potential Recovery: « | $ | |
| Estimated Timing of Resolution: « | | ▼ |
| Estimated Date of Resolution: « | | |
| Case Analysis: | | Browse... |

Current Budget

Is the budget below still accurate?

○ Yes  ○ No [if no - click here to edit budget]

| Fiscal Year 2004 Budget (01/04 to 12/04) | Total | Fees | Expenses |
|---|---|---|---|
| FY 2004 Budget | $990 | $450 | $540 |
| FY 2004 Budget to Date | $990 | $450 | $540 |
| FY 2004 Actual Billings | $278 | $264 | $14 |
| % Actual vs. Budget (FY 2004 to Date) | 28% | 59% | 3% |
| Total Matter Budget (11/01 to 06/04) | | | |
| Total Matter Budget | $200,000 | | |
| Total Matter Budget to Date | $92,265 | $76,850 | $15,415 |
| Total Actual Billings | $14,325 | $11,711 | $2,615 |
| % Actual vs. Budget (Total to Date) | 16% | 15% | 17% |

Figure 18B -- Ensuring The Accurateness And Currentness Of Information Provided By The Submitter Of An Electronic Invoice Throughout The Life Of A Matter

ENSURING THE ENTRY OF CERTAIN DATA IN A MATTER MANAGEMENT SYSTEM BY LEVERAGING ANOTHER PROCESS

CROSS-REFERENCE TO RELATED APPLICATION(S)

This application is a continuation-in-part of both U.S. patent application Ser. No. 10/864,290 filed on Jun. 9, 2004 now U.S. Pat. No. 7,617,154, which claims the benefit of U.S. Provisional Patent Application No. 60/477,425, filed on Jun. 9, 2003, U.S. Provisional Patent Application No. 60/497,247, filed on Aug. 22, 2003, and U.S. Provisional Patent Application No. 60/497,246, filed on Aug. 22, 2003; and U.S. patent application Ser. No. 10/923,606, filed on Aug. 20, 2004, which is a continuation-in-part of U.S. patent application Ser. No. 10/864,290, filed on Jun. 9, 2004 now U.S. Pat. No. 7,617,154, which claims the benefit of U.S. Provisional Patent Application No. 60/477,425, filed on Jun. 9, 2003, U.S. Provisional Patent Application No. 60/497,247, filed on Aug. 22, 2003, and U.S. Provisional Patent Application No. 60/497,246, filed on Aug. 22, 2003.

Each of the above-listed patent applications is hereby incorporated by reference in its entirety.

TECHNICAL FIELD

The present invention is directed to the field of automated tools for managing the collection of data about a project, legal matter, or legal case.

BACKGROUND

Corporate law departments and claims departments of insurance companies (collectively, "companies" or "clients") have used matter management systems to track information about legal matters and projects (collectively, "matters"). For example, such systems may be used to store a list of people involved in a matter, a schedule for a matter, a budget for a matter, a list of actions taken with respect to the matter, a set of documents relating to the matter, etc. One of the major weaknesses of these systems is that information about these matters can be inaccurately entered by its providers. Because the type of information contained in these matter management systems can be critical (e.g., estimates of potential liability which must be disclosed in certain situations), inaccurate information will result in unreliable reports about the matters and can also lead to other problems such as a failure to comply with Sarbanes-Oxley rules and other regulatory requirements.

One of the reasons that matter information may not be accurate is that many matter management systems have a set of fields that must be completed to create a matter on the system or that a third party such as a law firm is required to complete before beginning work on a project ("required fields"), but some or all of the information necessary to complete the required fields is not immediately available and may not be known or reasonably provided until weeks or even months after the matter has commenced. An example of this type of information includes potential liability probabilities and estimates for a litigated matter. (E.g., Financial Accounting Standard 5 establishes rules about when companies are required to recognize the potential loss contingency in the financial statements and disclose the existence of the potential suit to shareholders.) If there has not been a reasonable opportunity to investigate the facts or the law affecting the litigation, this potential liability information is not available or determinable. Consequently, if a user does not have all of the information necessary to complete the required fields when creating or setting up a matter, that user will have a "Catch-22" decision to either enter inaccurate or "dummy" information, or not create or setup the matter. If the user decides to enter inaccurate or "dummy" information, the user may forget or be too busy to go back into the system and correct the inaccurate or "dummy" information. If, on the other hand, the user decides not to create or set up the matter, then the matter management system cannot be immediately used for the matter.

An alternative to the required field approach is to make the entry of data in the matter fields not mandatory (an "optional field"); in other words, the user can save the matter form without having entered any value in the field. If the field is optional, it can eliminate the problem of a user entering inaccurate or "dummy" data when creating a matter. However, this solution is also often not satisfactory, because in many situations a blank field is as inaccurate as "dummy" information. Just like with required fields, if the user forgets or is to busy to go back into the system and enter the correct information in the optional field, information will never be entered and the system will have inaccurate data.

Another approach would be to make the field optional, but change the field to a required field at a later point in time; in other words, the user can initially create or setup the matter without having filled in any information in the optional field, but then later after the field becomes required, if the user tries to edit or provide any information in the matter fields, the system will not allow the user to save the matter field form without the recently-required field to be completed. This approach, although preferable to the prior two approaches described above, is also not satisfactory because if there is no need to re-edit the matter information in the future, the form never needs to be resaved. Thus, this delay in making the field required does not ensure that the data will ultimately be provided into the field.

Finally, a system could use an alerting system to remind a responsible person to enter information in required fields that are incomplete, but the alerting system may not be a sufficient incentive to cause the person to enter the desired information in the fields. For example, if the system sends an email reminder, the user can simply ignore or delete the email message without entering information in the required fields that are incomplete.

The problems described above can also exist in situations where a user who is not responsible for managing the matter initially creates the matter in the system for the person who is responsible for the matter. For example, a secretary of an attorney may be responsible for initially creating the matter for a company, or entering data for a law firm to setup the matter, but the secretary may not know or have access to all of the information necessary to complete the required fields of matter information. What the secretary would like to do is fill in the information available to the secretary at the time of saving the form, and then have the attorney fill in the remaining matter information later. This situation involving a secretary and an attorney, however, raises all of the same problems described above. If all of the fields are required fields, the secretary must enter "dummy" information or not provide any information. Alternatively, if the secretary has the option of leaving the fields blank, then the in-house attorney may fail to later enter the important matter information, so the fields are always blank.

Accordingly, a software facility that overcame some or all of the aforementioned shortcomings relating to the accurateness of information in a matter management or project management system would have significant utility to corporate law departments, claims departments of insurance companies, and other entities managing projects such as law firms.

BRIEF DESCRIPTION OF THE DRAWINGS

FIG. 1 is a high-level block diagram showing a typical environment in which the facility operates.

FIG. 2 is a display diagram showing a typical user interface presented by the facility for configuring whether a field is required of users, and if it is required, which user is it required of and when does the field become required.

FIG. 3 is a display diagram showing a typical new matter form presented by the facility in which there may be one or more required fields.

FIG. 4 is a display diagram showing a sample pop-up warning message presented by the facility to the person attempting to save a matter form in which one or more soft-required fields do not have a value entered.

FIG. 5A is a table diagram showing sample contents of a matter fields setup table used by the facility to determine what matter fields are required to be completed, and which processes to leverage to ensure information is entered in the required matter fields.

FIG. 5B is a table diagram showing sample contents of a matter fields table used by the facility to track whether a value has been saved in a field that is in use, and if a value has not been saved, whether that field is currently required and therefore the field is identified as incomplete.

FIG. 6 is a flow diagram showing steps typically performed by the facility to determine whether a matter has any fields that are currently required for which no information has been entered into the field.

FIG. 7 is a display diagram showing a sample alert displayed to a user on the matter page notifying the user that there are one or more required matter fields that are incomplete.

FIG. 8 is a display diagram showing a sample dashboard or system-wide alert page presented by the facility to a user to identify one or more matters that required matter fields that are blank.

FIG. 10 is a flow diagram relating to FIG. 9, and shows steps typically performed by the facility to determine if the user should be allowed to submit other data to a matter such as a document.

FIG. 11 is a display diagram showing how the closing matter process can be leveraged to ensure that the required matter fields are completed.

FIG. 12 is a flow diagram relating to FIG. 11, and shows steps typically performed by the facility to determine if the user should be allowed to close a matter.

FIG. 13 is a display diagram showing how the invoice approval process can be leveraged to ensure that the required matter fields are completed.

FIG. 14 is a flow diagram relating to FIG. 13, and shows steps typically performed by the facility to determine if the user should be allowed to approve an invoice.

FIG. 15 is a display diagram showing a setup of a new matter in which a user specifies outside vendor responsible for the matter, and if allowed by the system level setup, which budget information, status report information, and/or spending accrual information is required of the outside vendor and/or the company.

FIG. 16 is a table diagram showing how the facility determines if and when a status report is due and what fields are required to be completed by the outside vendor and/or the company in the status report.

FIG. 17 is a flow diagram showing steps typically performed by the facility to determine when a status report form is due and what data is required to be completed by the outside vendor and/or the company in the status report form.

FIGS. 18A and 18B are display diagrams showing the web page form that might be presented to the responsible user (and his or her delegates) of the outside vendor and/or the responsible user (and his or her delegates) of the company so that such user can provide the required status report data.

DETAILED DESCRIPTION

Figure 9:
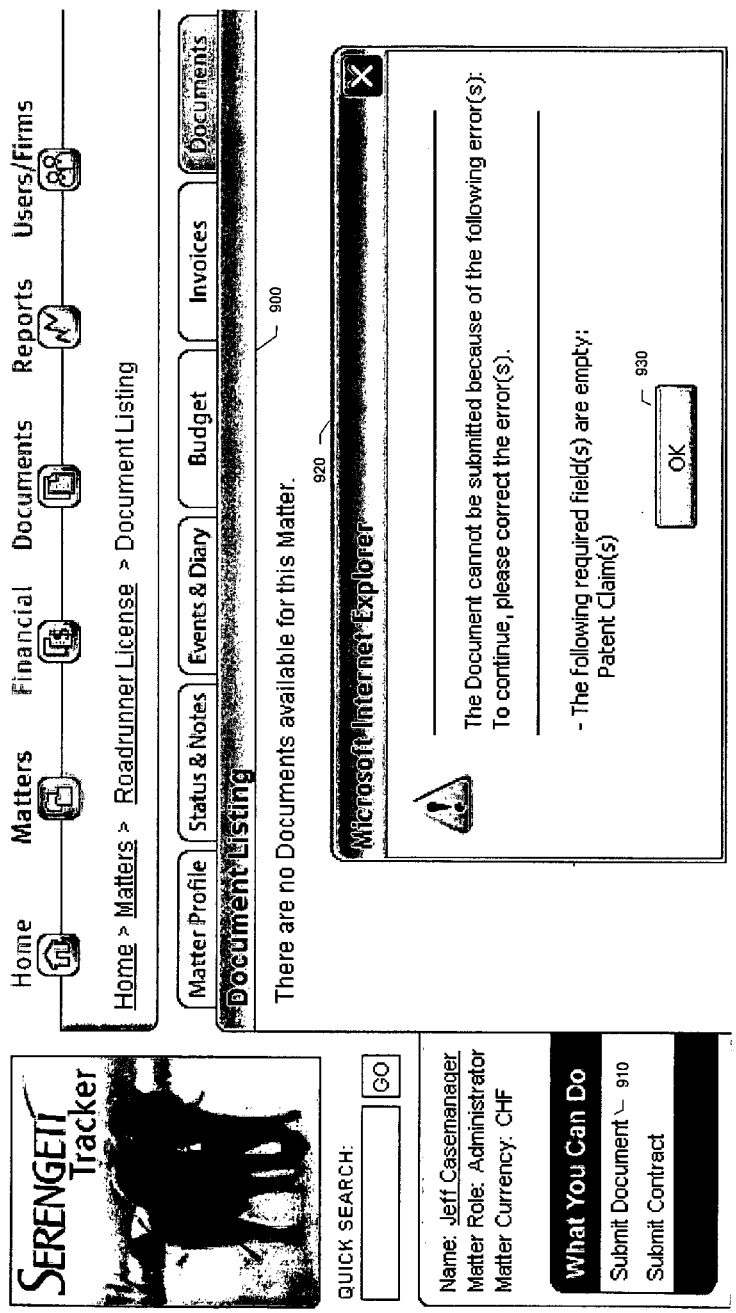
FIG. 9 is a display diagram showing how the posting of other matter data, such as documents, can be leveraged to ensure that the required matter fields are completed.

A software facility for ensuring the entry of certain data in a matter management system at a specified time in the future by leveraging another process (the "facility") is described. The facility tends to ensure that certain fields of information about the matter (the "required matter fields") are provided at the appropriate time. In some embodiments, the facility requires both company users (such as corporate law department users or insurance claims department users) and outside vendors (such as law firms, consulting firms, or other submitters of invoices) to provide matter information. Accordingly, the functionality relating to the required matter fields could apply to either company users or outside vendor users.

The following example demonstrates the usefulness of the above-described functionality. Financial Accounting Standard 5 sets forth requirements for recognizing a potential loss contingency in the company's financial statements, or disclosing the existence of a potential liability to shareholders. If a company fails to make a timely analysis of the potential loss contingency of a dispute or lawsuit, it may cause a material misstatement in the company's financial statements. Because of this potential impact to financial statements, some companies' analysis of potential loss contingency is governed by Sarbanes-Oxley regulations, which require that companies establish and maintain adequate internal controls over financial reporting. Thus, if a company enters and tracks information about potential loss contingencies using a process that forces the immediate entry of information about the potential liability analysis, such analysis may not be reliable because the company has not had sufficient time to complete an analysis of the law and facts. Similarly, any process that does not ensure that such analysis has been completed and information about such analysis has been recorded is not reliable. In either situation, the company may not be able to certify that it has adequate internal controls with respect to this financial information, and therefore will not be able to comply with Sarbanes-Oxley rules and regulations. On the other hand, the facility enables users to complete the analysis within a designated time period after the matter has been created and there has been sufficient time to complete an analysis of the law and facts, yet ensures that this information is ultimately and timely entered into the facility.

In some embodiments, the facility specifies the required matter fields, and when the matter fields become required. For example, a field could be required when the matter is first created, or it could be required a specified number of days after the matter is created, or within so many days of another event in the matter or facility. For example, the event could be the trial date in a litigation matter, or it could be the beginning of a new fiscal quarter. Those skilled in the art will appreciate that there may be other trigger events linked to the requirement that matter information be completed, such as the spending the in the matter exceeds the matter budget.

In some embodiments, the facility is configurable so that the company can specify the required matter fields, and when the required matter fields become required. This configurability could be at the facility-level, across all of a company's matters, for specific categories of matter, and/or on a matter-by-matter basis. In some embodiments, the company's setup of required fields will also specify which user is required to complete the field. For example, the facility could specify that the estimate of exposure field in a litigated matter will become required 90 days after the matter is created, and the lead company person and his or her supervisor must provide a value in the field. Alternatively, the facility could be configured so that the company creates the matter by completing a minimum set of fields (such as the matter name, matter description, and law firm managing the matter), and then a third party vendor such as a law firm is responsible for completing the required fields at a specified time in the future (again either on a specific date or related to a matter or facility event).

As described above, one aspect of the facility is defining which are the required fields, and when they become required. Another aspect of the facility is specifying what process or processes the facility will leverage to ensure that information is ultimately provided into the required fields. In some embodiments, the facility prevents other data related to the matter from being entered or edited until all required matter fields have been completed. For example, in some embodiments, the facility prevents users from saving and storing files or documents, entering budget amounts for a matter, posting invoices, or providing information that characterizes the present status of the matter, referred to herein as a "status report." In some embodiments, the restriction placed on certain processes may apply to all users involved in the matter, or it may apply only to the user or users who are responsible for entering information in the required matter fields. While various examples of processes that can be leveraged to enforce a delayed-required field have been described above, those skilled in the art will appreciate that there may be additional types of data relating to the matter that can be leveraged to ensure that required matter information is ultimately and timely provided.

In some embodiments, the facility prevents completion of a matter-related process until all required matter fields have been completed. For example, if a user decides to change the status of a matter from "open" to "closed," as part of the process of closing the matter the facility requires the person closing the matter to complete any required matter information that was left blank. In some embodiments, the facility prevents a company user responsible for a required matter field from (i) reviewing and/or approving, modifying, or rejecting an invoice posted by an outside vendor, (ii) reviewing and/or approving, modifying, or rejecting a budget submitted by an outside vendor to the matter, and/or (iii) reviewing and/or approving, modifying, or rejecting a document submitted by an outside vendor to the matter. In some embodiments, the restriction that information in all required matter fields must be entered before a matter-related process can be completed is applied to all users involved in the matter, or some embodiments apply the restriction only to the user or users who are responsible for entering information in the required matter fields. While various examples of processes have been described above, those skilled in the art will appreciate that there may be additional types of processes relating to the matter that can be leveraged to ensure that required matter information is ultimately and timely provided.

In addition, the facility can use the capabilities described above to give users more flexibility in the entry of information in required matter fields, but still ensure that the information is ultimately provided. For example, in some situations, the user creating a matter may not know or have access to the information necessary to complete a required matter field. The user is in a "Catch-22"—either the person has to enter "dummy" information into the required matter field or the person cannot create the matter. In some embodiments the facility will differentiate between a "hard-required" matter field and a "soft-required" matter field. A hard-required matter field is a field in which information must be entered for the form to be saved. A soft-required matter field is one in which the facility allows the user to save the form with the soft-required field blank, but the facility then blocks the entry of some or all other data in the matter and/or prevents the completion of some or all processes in the matter as described above to ensure that information is ultimately entered in the soft-required field. In some embodiments, the facility specifies which fields are hard-required and which fields are soft-required. In some embodiments, the facility enables companies to determine which fields are hard-required and which fields are soft-required.

Details of how the facility may be implemented are described below in conjunction with FIGS. 1-18B.

FIG. 1 is a high-level block diagram showing a typical environment in which the facility operates. The block diagram shows several client computer systems used by company users or outside vendor users, such as client computer systems 110, 120, 130, and 140. Each of the client computer systems has a web client computer program for browsing the World Wide Web, such as web clients 111, 121, 131, and 141. The client computer systems are connected via the Internet 150 to a server computer system 160 hosting the facility. Those skilled in the art will recognize that client computer systems could be connected to the server computer system by networks other than the Internet, however. Typically, to be able to connect to the server computer system, the client computer systems must properly authenticate itself to the server computer system, such as by providing user ID and password, or using other authentication technology.

The server computer system 160 contains a memory 170. The memory 170 contains the facility 171, incorporating both matter management functionality 172 and electronic invoicing functionality 173 typically used by the facility. The memory typically contains a web server computer program for delivering web pages in response to requests from web clients. While items 171-174 may be stored in memory while being used, those skilled in the art will appreciate that these items, or portions of them, may be transferred between memory and a persistent storage device 183 for purposes of performing memory management and maintaining data integrity. The server computer system further contains one or more central processing units (CPU) 181 for executing programs, such as programs 171-174, and a computer-readable media drive 182 for reading information or installing programs such as the facility from computer-readable media, such as a floppy disk, a CD-ROM, or a DVD.

While various embodiments are described in terms of the environment described above, those skilled in the art will appreciate that the facility may be implemented in a variety of other environments including a single, monolithic computer system, as well as various other combinations of computer systems or similar devices connected in various ways. Additionally, those skilled in the art will appreciate that the facility may be implemented using various software configurations, such as configurations in which the matter management and electronic invoicing software are merged, or other configurations in which their functionality is divided across a larger number of modules, and/or distributed over multiple computer systems.

FIG. 2 a display diagram showing a typical user interface presented by the facility for configuring whether a field is required of users, and if it is required, which user is it required of and when does the field become required. This "setup" shown on web page 200, is therein titled "Edit Matter Category." Web page 200 shows setup being performed on a per matter category basis, but it could also be for all matters, or on a matter-by-matter basis. The matter category shown is titled "Litigation" 210, and it is active 211.

The user interface provides several setup options for the fields of matter information. For example, the first selection is whether the field is used. In some embodiments, there may be some fields that must be used in the setup of the system 220 (e.g., when a user creates a new matter, this field must be shown in the matter form). With respect to other fields, the company may have the option to use them 221, or not use them 222.

In some embodiments, the facility gives companies the ability to pick which fields are "required" (the field must have a value for the form containing the matter information to be saved) or "optional" (the field does not have to have a value for the form containing the matter information to be saved). As shown in web site 200, the company may have the option of making the field required of the company user responsible for the matter 230 or the lead law firm user responsible for the matter 231. The field titled Description of Asset Exposure is an example of an optional field 232. In some embodiments, the company may not have the ability to choose which fields are required, and the facility has been pre-configured with one or more required fields 233.

In some embodiments, the facility gives companies the ability to specify when the field will become required. Some fields the facility may be pre-configured to require the field upon matter creation 240. Alternatively, the company could specify that the field is required immediately when the matter is created 241. Or the company could specify a number of days in relationship to an event, such as the number of days after matter creation 242, the number of days after the company was served with a lawsuit 243, the number of days after notice of loss 244, or the number of days before an event such as a trial date 245.

In some embodiments, the facility gives companies the ability to specify what actions will be restricted once a field becomes required and the required information has not been provided (in other words, what actions will be restricted to create leverage to ensure that the required field is completed). For example, if a matter field has become required and if the company has received an invoice to the matter, the facility prevents the invoice from being approved until the matter field has been completed 250. The restricted action could also be paying an invoice 251, submitting other data to the matter 252, or a any of the foregoing 252.

While various embodiments are described in terms of the setup described above, those skilled in the art will appreciate that the facility may be implemented in a variety of other setup criteria and options. The facility may be completely pre-configured with no setup options, or all of the possible setup options could be modifiable by the company. Also, the setup can be varied for each subject matter type within each matter classification (e.g., environmental, employment/labor, securities, business contracts, etc. are examples of different subject matter types). In addition, many events can trigger a field to become required. For example, the facility may enable an administrator to make all company estimates of exposure due within a specified number of days of the company's quarterly reports, regardless how many days the matter has been open. Also, there could be many types of actions that could be prohibited to create leverage to ensure that the information is entered into the matter field that has become required. In addition, the facility could make fields required of a specific users (e.g., the lead company person, or lead law firm attorney). Also, in the embodiment shown in FIG. 2, the company is not allowed to configure the facility to specify which fields are "hard-required" fields, and which fields are "soft-required" fields. In other embodiments, the facility enables the company to specify which fields are "hard-required" fields, and which fields are "soft-required" fields in the facility setup.

FIG. 3 is a display diagram showing a typical new matter form in which there may be one or more required fields. This form, shown on web page 300, is therein titled "New Matter—Create Profile." In some embodiments, the facility displays in a legend 310 showing which fields must be completed for the form and any information therein to be saved ("hard-required" fields) 320; and which fields, although required for future work or processing, can be left blank when the matter form is saved ("soft-required" fields) 330. In addition, the form may display to the user that the field is not currently required, but will become required at a specified date in the future 340.

FIG. 4 is a display diagram showing a sample pop-up warning message 400 that is shown to the person attempting to save a matter form 300 in which one or more soft-required fields do not have a value entered 410. Notice that the warning message gives the user the option of saving the form even though there are soft-required fields that have not been completed 420. If the user had tried to save the matter form with one or more hard-required fields for which no value had been entered, the user would not be presented with the option of saving the form. A similar warning message may be provided for fields that are not currently required, but will become required in the future. Those skilled in the art will appreciate that the facility may provide other methods for notifying the person trying to save the matter form that soft-required fields have not been completed, and preventing the user from saving the matter form if hard-required fields have not been provided.

FIG. 5A is a table diagram showing sample contents of a matter fields setup table used by the facility to determine what matter fields are required to be completed, and which processes to leverage to ensure information is entered in the required matter fields. The matter fields setup table 500 is comprised of rows, such as rows 501-511, each of which corresponds to a unique matter field. Column 512 determines whether the field will be used in the matter. In the particular embodiment shown in FIG. 5A, the facility requires certain fields to always be used in every matter 513; other fields the company may have decided to use 514 or not use 515. Column 516 determines whether the field is required or optional. In the particular embodiment shown in FIG. 5A, the facility requires certain fields to always be required in every matter 517; other fields the company may have decided to make required of company users 518, or of law firm users 518a, or not required 519. Column 520 determines when the field (if used) is required. In the particular embodiment shown in FIG. 5A, the facility requires certain fields to be required immediately 521; other fields the value specified 522 is the number of days in relationship to the event specified in the Trigger Event column 523. In this particular embodiment, if the field is not used (such as in row 507) or if the field is not required (as in row 506), then the designation in column 520 is ignored. Column 523 specifies the date used to determine when a required field becomes due. For example, in row 505, the Case Summary for Audit letter field becomes required 60 days after the Service Date that has been entered in the matter (which in this particular embodiment is the "Start Date"). Column 524 specifies the method used to ensure that information in the required field is ultimately entered (e.g., users are not allowed to submit other data as shown in row 505, or invoices cannot be paid as shown in row 510, or no data or other process is allowed as is shown in row 508). If a field is "hard-required," the method is not applicable (as shown in rows 501-504) because information is required to be entered in the field for the matter form to be saved. Column 525 specifies whether the field is a "hard-required" field (i.e. a value must be entered for the user to be able to save the matter form such as the one shown in FIG. 3), or a "soft-required" field (i.e. a value is not required to be entered for the user to be able to save the matter form, but if a value is not entered in some embodiments the facility will provide a warning as shown in FIG. 4). In this particular embodiment, if the field is not used (such as shown in row 507) or if the field is not required (as in row 506), then the designation in column 525 is ignored.

FIG. 5B is a table diagram showing sample contents of a matter fields table used by the facility to track whether a value has been saved in a field that is in use (e.g., in FIG. 5A rows 501-506 and 508-511 are designated as in use), and if a value has not been saved for the field in a matter, whether that field is currently required and therefore the matter form is identified as incomplete. The matter fields table 550 is comprised of rows, such as rows 551-553, each of which corresponds to a unique matter. Columns 554-565 are the fields used by the facility for each matter. In this particular embodiment, table 550 shows only a partial list of the fields, and the facility may have many more fields, each of which is contained in a column. The value that has been saved in each field is shown in table 550. If no value has been saved, the table cell is blank 567. One of the columns 566 is not a matter field, but is instead a field to track whether all fields that are currently required have a value that has been entered. The steps that the facility uses to determine if a currently required matter field is incomplete is shown in FIG. 6.

While each of the table diagrams in FIG. 5A and FIG. 5B show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 6 is a flow diagram showing steps typically performed by the facility to determine whether a matter has any fields that are currently required for which no information has been entered into the field, and when alerts should be displayed or sent to users about matters that have one or more currently-required fields that are incomplete. The facility may make this determination in several different situations. In one situation, the facility runs a periodic subsystem 610 (e.g., every night), to determine if any field in matter has become required 611. The facility determines if the field is currently required by using the matter field setup table 500 and the matter fields table 550 shown in FIGS. 5A and 5B respectively. For example, if the field is in use (e.g., 514); if the field is designated as a required field (e.g., 518); if the time for the requirement has been triggered (which is determined by using the date that the subsystem is running compared to the number of days (e.g., 522) before or after the applicable Trigger Event (e.g., 523 and 557)), then the field is identified by the facility as currently required. If any currently-required field in a matter has no value, then the facility marks the matter as having a currently-required field that is incomplete 612 (in the matter field table the matter is marked in column 566, e.g., 578 and 579).

Several examples demonstrate this calculation by the facility. In table 550, none of the matters have values entered for the Claims field, Key Issues field, and Trial Strategy field (567-575). Because the Claims field is not required 519, the facility does not identify this field as currently required. Similarly, the facility does not identify the field of Key issues field as currently required because the field is not in use 515. Although the Trial Strategy Memo field (row 508) is in use, and is a designated a required field, the field is not currently required for matters 551 or 552 because the date that the subsystem is being run (assume for purposes of this example it is May 1, 2006) is not within 90 days of the Trial date (column 563). On the other hand, the field is currently required for matter 553 because at the time the subsystem is being run the matter is within 90 days of the Trial date and the Trial Strategy Memo field is blank, and consequently, the facility has marked matter 553 as having a currently-required field that is blank 579. Similarly, although the Trial Strategy Memo is not a currently-required field for matter 552, the Company Liability Estimate field is a currently-required field at the time when the facility subsystem was run (the field becomes required 90 days after matter creation as specified in row 510, and the matter was created on Dec. 12, 2005, and the subsystem in this example was run on May 1, 2006), and therefore the facility has marked matter 552 as having a currently-required field that is blank 578.

When running subsystem 610, if the facility marks the matter as having one or more currently-required fields that are incomplete 612, then in some embodiments the facility provide alerts within the facility (e.g., FIG. 7 and FIG. 8) and/or will send an email alert to the responsible users notifying them that one or more fields in the specified matter have become due and a value must be entered before other data can be saved to the matter and/or process can be completed 640. If the matter has no incomplete fields that are currently required, the matter is marked as such in the matter table 650 (for example, 577 in FIG. 5B).

FIG. 6 shows other situations in which the facility determines if a matter has any fields that are currently required for which no information has been entered into the field. Whenever a system administrator changes the setup of the fields in the facility (as shown in display FIG. 2, which affects the values in table 500) the facility runs a subsystem 620 to check every matter in the facility to determine if there is a currently-required field for which no value has been entered 621. If any currently-required field in a matter has no value, then the facility marks the matter as having a currently-required field that is incomplete 622 (in the matter field table the matter is marked in column 566, e.g., 578 and 579). When running the subsystem identified by 620, if a matter is marked as having one or more currently-required fields that are incomplete, then in some embodiments the facility provide alerts within the facility (e.g., FIG. 7 and FIG. 8) and/or will send an email alert to the responsible users notifying them that one or more fields in the specified matter have become due and a value must be entered before other data can be saved to the matter and/or process can be completed 640. If the matter has no incomplete fields that are currently required, the matter is marked as such in the matter table 650, as is shown in field 577 in FIG. 5B for the "Georgie Porgie v. Acme" matter.

In addition, whenever a user attempts to save a matter form 630 (whether creating a new matter as shown in FIG. 3 or saving the matter form for an existing matter), the facility determines whether there are any hard-required fields or soft-required fields that are blank. If there are any hard-required fields that are blank (as determined from column 525 in the matter field setup table 500), the facility displays an error message to the user stating that the user must provide values for the identified hard-required fields to be able to save the matter 631. If there are any soft-required fields that are currently required that are blank, (1) the facility displays an warning message to the user stating that one or more currently-required fields are blank, but the warning message allows the user to save the matter form 631 (example of message shown in FIG. 4); and (2) the facility marks the matter as having one or more currently-required fields that are incomplete 632.

While various embodiments are described above with respect to the steps a facility uses to identify whether a matter has any currently-required fields that are incomplete, those skilled in the art will appreciate that the facility may have a variety of other means of determining whether a matter has any currently-required fields that are incomplete.

FIG. 7 is a display diagram showing a sample alert presented by the facility to users who are viewing a matter that has one or more currently-required fields that are incomplete. If a matter has been created with one or more soft-required fields that do not have a value entered, or if a field that was not previously required becomes required, in various embodiments, the facility provides a variety of alerts to company users that the matter data is incomplete with respect to required fields. The matter data is displayed on a web page 700, and in this particular embodiment the alert 710 is contained within a summary section at the top of the web page 720. The alert may also identify the specific fields that are required but for which no value has been provided 730.

In some embodiments, the facility may display the alert on each user's home page or master dashboard page. FIG. 8 is a display diagram showing such a web page 800, in which an alert is displayed to the user identifying one or more required fields in the matter profile that are incomplete 810. In this particular embodiment the user can click on the "Due" hyperlink to jump directly into the web page that displays the matter data.

In some embodiments, if a matter field becomes required and there is no value in the field, the facility will notify the person responsible for the matter by sending an email to such person notifying him or her that a field that currently has no value has become required.

While various embodiments are described above with respect to alerts to users if fields that are required or have become required do not have a value in the field, those skilled in the art will appreciate that the facility may have a variety of other means of notifying the user that the required field or fields are incomplete.

FIG. 9 is a display diagram showing how the posting of other matter data (and in this diagram specifically the posting of documents to a matter) can be leveraged to ensure that the required matter fields are completed. In this particular embodiment a user accesses the web page where the user can post documents 900. In some embodiments, when the user clicks the action to post a document 910, if there are any required matter fields that are blank, the facility displays a pop-up message explaining that documents cannot be posted until the incomplete required matter fields have the proper information entered 920. In some embodiments, when the user clicks the button to proceed 930, the facility then displays the matter profile form displayed in FIG. 3, which the user can complete to enable the matter to be closed.

FIG. 10 is a flow diagram relating to FIG. 9, and shows steps typically performed by the facility to determine if the user should be allowed to submit other data to a matter such as a document. The user accesses web page in the matter where the user can post a document 1010. The user clicks the action to post a document 1020. The facility checks the matter fields table described in FIG. 5B to determine if the matter has any required matter fields that are incomplete 1030. If there are required matter fields that are incomplete, the facility will not allow the document to be posted, and will display a message to the user that certain required matter fields must be completed before the document can be posted 1040. Those skilled in the art will appreciate that the steps shown in FIG. 10 may be altered in a variety of ways. For example, in some embodiments the facility may not allow the user to access the location for posting documents if there are any required matter fields that are blank.

FIG. 11 is a display diagram showing how the closing matter process can be leveraged to ensure that the required matter fields are completed. In this particular embodiment a user accesses the matter and triggers an action in the facility to close a matter. In some embodiments the facility displays a web page 1100 that is a form of information required to be entered to be able to close the matter 1110. When a user fills out the close matter form and clicks the action to close the matter 1120, the facility displays a pop-up message explaining that the matter cannot be closed until the incomplete required matter fields have the proper information entered 1130. In some embodiments, when the user clicks the button to proceed 1140, the facility then displays the matter profile form displayed in FIG. 3, which the user can complete to enable the matter to be closed.

FIG. 12 is a flow diagram relating to FIG. 11, and shows steps typically performed by the facility to determine if the user should be allowed to close a matter. The user accesses the matter and clicks an action to close the matter 1210. The facility displays a closing matter form 1220 shown in FIG. 11, and the user completes the fields in the close matter form, and clicks an action to save and close the matter 1230. The facility checks the matter fields table described in FIG. 5B to determine if the matter has any required matter fields that are incomplete 1240. If there are required matter fields that are incomplete, the facility will not allow the matter to be closed, and will display a message to the user that certain required matter fields must be completed before the matter can be completed 1250. Those skilled in the art will appreciate that the steps shown in FIG. 12 may be altered in a variety of ways. For example, in some embodiments the facility may not allow the user to access the close matter form if there are any required matter fields that are blank.

FIG. 13 is a display diagram showing how the invoice approval process can be leveraged to ensure that the required matter fields are completed. In this particular embodiment the user accesses a web page (called the "invoice pending page") 1300, which displays a list of invoices 1310 that are pending the user's review and approval. In this embodiment, each invoice is posted to a matter 1315. If all of the required matter fields in a matter have been completed, the user is presented with a dropdown selection of options for approval of the invoice (e.g., "Recommend Pay in Full") 1320. If, however, one or more required matter fields are incomplete, then the user is not presented with a dropdown selection of invoice approval options, and instead is notified that there is an incomplete task 1330. In this embodiment the user can click on a link 1340 to access the matter profile form displayed in FIG. 3. Once the user enters information in the required matter fields for the matter, the incomplete task alert will be removed from the invoice pending page, and the user will be allowed to approve an invoice. While various embodiments are described above with respect to preventing a user from approving an invoice if one or more required matter fields are blank, those skilled in the art will appreciate that the facility may have a variety of other means ensuring that the required matter fields have been completed before a user can process an invoice that has been posted to a matter. For example, the user may be prohibited from even accessing or viewing the invoice if any of the required matter fields are incomplete, or the facility may allow the invoice to be approved, but not sent to accounts payable for payment until all of the required matter fields are completed. Alternatively, the approval options may not be displayed on the invoice pending page, but on a different web page displaying the invoice.

FIG. 14 is a flow diagram relating to FIG. 13, and shows steps typically performed by the facility to determine if the user should be allowed to approve an invoice. The law firm posts an invoice to a matter 1410. The facility routes the invoice for approval, and the invoice becomes pending the review of a company user who has responsibility for entering information in the required matter fields 1420. When the company user accesses the invoice pending page 1430, the facility identifies the invoices that should be displayed on the pending page for the user. Prior to rendering the invoice pending page, with respect to the matter corresponding to each invoice on the invoice pending page the facility will also check the matter fields table described in FIG. 5B to determine if there are any matters with required matter fields are incomplete. If there are required matter fields that are incomplete, the facility will not display the invoice approval selections (1320 in FIG. 13) for the invoice, and will instead display an incomplete task alert (1330 in FIG. 13) 1440. If all the required matter fields of the matter to which the invoice was posted have been completed, then the invoice approval selections (1320 in FIG. 13) will be displayed to the user with respect to the invoice. Those skilled in the art will appreciate that the steps shown in FIG. 14 may be altered in a variety of ways. For example, some embodiments of the facility may always display the invoice approval selections, and check the matter fields table in FIG. 5B once the user has selected the invoice approval option, in which case the incomplete task alert would be shown to the user when the user attempts to submit the invoice for approval (1350 in FIG. 13).

In some embodiments, the facility permits a company to set up matters in a manner that requires company users to provide or approve information contained in the status report instead of, or in addition to, vendor users. This functionality is discussed below in connection with FIGS. 15-18B.

FIG. 15 is a display diagram showing a typical new matter setup in which a user specifies an outside vendor responsible for the matter, and if permitted by the system-level setup, which budget information, status report information, and/or spending accrual information is required of the outside vendor and/or the company. In various embodiments, the facility permits a company user to perform the setup for a single matter; all of its matters; all of its matters with a particular outside vendor; or a proper subset of all of its matters selected in any other way.

The matter setup page may have other selections about the matter which do not involved required fields 1501. However, in the budget setup section 1510, the facility enables the company user to specify whether a budget is required of the outside vendor 1513 and when the budget is required 1514, what type of budget is required 1512, and/or whether an accrual entry for outside vendor spending during the fiscal year that has not yet been billed (used by companies that use the "accrual" method of accounting) 1515 and when the accrual entry is required 1516.

In the status report setup section 1530, the facility enables the company user to specify whether a monthly or quarterly status report is required of the outside vendor and/or the company 1532 and when the first status report is required 1533; whether a detailed case assessment is required to be attached to a status report 1534 and in which status report the detailed case assessment should be provided 1535; whether a detailed trial analysis is required to be attached to a status report 1536 and in which status report the detailed trial analysis should be provided 1537; and/or whether the matter budget 1538, estimates of exposure/recovery 1539, estimates of resolution 1540, and/or a case summary 1541 are required, and if already provided displayed and confirmed, and when such data (i.e., 1538-1541) is first required to be provided/confirmed 1542/1543. This section also contains a set of radio buttons 1544 that the company user may use to indicate whether the selected status report options are required of the outside vendor, the company, or both.

In the Outside Vendor Responsible setup section 1550, the facility enables the company user to specify the outside vendor user responsible for the matter 1551 and the system automatically fills in the name of the outside vendor associated with such user 1552. Those skilled in the art will appreciate that the user interface for selecting the outside vendor user responsible and the outside vendor may be implemented in a variety of other selection options. In addition, those skilled in the art will recognize that while the selections identified in FIG. 15 is on one web page, such selections may be made in a sequence of web pages.

FIG. 16 is a table diagram showing how the facility determines if and when a status report is due and what fields are required to be completed by the outside vendor in the status report. The status report table 1600 is comprised of rows, such as rows 1601-1605, each corresponding to a matter. Each row is divided into a matter ID column (which is the object ID in the facility) 1606; the matter name 1607; the status report option 1608; whether the status report is to be augmented or confirmed by the outside vendor, the company, or both 1609; if a budget is to be confirmed or updated in the status report, the budget type 1610; requirement that the status report include a case assessment and when it is due in terms of the number of days after the matter was created 1611; requirement that the status report include a trial assessment and when it is due in terms of the number of days before the trial data 1612; requirements for other data 1612 and when such data is due 1614; the date of the last status report 1615; and the date the matter was created

1616. The facility can determine from the data in each row whether a status report is due at any given time and what fields should be displayed in the status report. For example, the status report options column 1608 is one check to determine if a status report is due that month. If the selection is "Quarterly," and the current day is Apr. 2, 2004, and if a status report was not submitted Apr. 1, 2004, or Apr. 2, 2004 (as shown in the date of the last status report 1615), then the status report is due (in this particular embodiment the "Quarterly" selection uses the quarters of a calendar year, but those skilled in the art will appreciate that the frequency of the reporting option or the cycle dates can vary).

Even if a status report is not required because of the status report option field, there are other reasons that a status report may be due. For example, if as shown the "Big E. Rentals" matter was created on Jan. 15, 2004, and if a case assessment is due 60 days thereafter, a status report due alert would be generated and displayed to the outside vendor user responsible for the data (or his or her delegate) on Mar. 15, 2004, and the outside vendor would not be able to submit invoices until such status report data is provided. If an outside vendor opened up the status report form between March 15th and March 31, the form might include a field for the current status of the matter and a field in which the user is required to attach a document containing the case assessment prior to saving the form. If the user does not submit a status report during such time period, and opens up the status form report after March 31, the form may also require additional data (e.g., if the status report table specifies that a budget must be confirmed Quarterly).

Similarly, the facility can use the trial assessment due column 1612 to determine if a status report is due, and if the status report form should include an attachment containing the trial assessment (the facility must reference the trial date contained in a separate table in the facility, which can be cross referenced using the Matter Object ID 1606).

Similarly, the facility can use the "Display Options" column 1613 to determine (i) if the status report form displays the current budget and requires the outside vendor user to confirm or update the budget (if the first number in the three-digit sequence is a 1 the budget must be displayed and confirmed, if the digit is a 0, the budget is not displayed); (ii) if the status report form displays the current estimates of exposure/recovery and requires the outside vendor user to confirm or update the estimates of exposure/recovery (if the second number in the three-digit sequence is a 1 the estimates of exposure/recovery must be displayed and confirmed, if the digit is a 0, the estimates of exposure/recovery are not displayed); and/or (iii) if the status report form displays the resolution estimates and requires the outside vendor user to confirm or update the resolution estimates (if the first number in the three-digit sequence is a 1 the resolution estimates must be displayed and confirmed, if the digit is a 0, the resolution estimates are not displayed). In connection with the Display Option column, the facility uses the "Display Options Due" column 1614 to determine in what status report such data is shown and required to be updated (after which it will be included in all future monthly or quarterly status reports).

Those skilled in the art will recognize that the facility could be designed so that any type of data could be required to be input or updated in the status report form. Essentially, the status reporting tool can be used to ensure that any type of data in the facility is provided at a specific point in time, or periodically confirmed and/or updated throughout the life of the matter.

FIG. 17 is a flow diagram showing steps typically performed by the facility to determine when a status report form is due and what data is required to be completed by the outside vendor and/or the company in the status report form. The company first creates system-level requirements for data 1701, or sets requirements for data when a matter is created 1702. Then, after an outside vendor user responsible for data in one or more matters (or his or her delegates) or a company user responsible for data in one or more matters (or his or her delegates) logs into the facility 1703, the facility checks to determine if the user is responsible for any matters in which data is required and due 1704. This includes but is not limited to determining if there is a monthly or quarterly status report due for the month, or if other data is required to be provided for that month such as a case assessment. If data is required and due for any of the user's matters, the facility provides an alert for each matter in which a status report is due (as shown in FIG. 4) 1705. The user can access the matter and call up the status report form for the matter 1706, and the facility will generate the status report form with the fields for the required data 1707. The user can then enter the data in the status report form, and save the form 1708. The facility will save and display the status report, and may save data to other portions of the facility (e.g., if the status report form included a case assessment document that was attached, the attached document will be saved in the documents folder for the matter; or if the data includes an estimated resolution date, the data will be saved in the matter profile for the matter) 1709. Once the status report has been submitted that satisfies the requirement for the data that is required and due, the outside vendor user (or another outside vendor user for the same vendor) can submit an invoice to the matter so long as no other data is required and due for the matter 1710. Similarly, once a company user submits a status report that satisfied the requirement of the data that is required and due, the company user (or another company user) can approve an invoice submitted to the matter so long as no other data is required and due for the matter 1210.

FIGS. 18A & 18B are display diagrams showing examples of web page forms that may be presented to the responsible user (and his or her delegates) of the outside vendor or of the company so that such user can provide the required status report data. FIG. 18A shows an example of the first status report input form 1800 for the matter that might be presented to the responsible user or delegate. The form has a field to specify the current status 1810, a field to specify the total budget for the matter 1820, and fields to enter the monthly fees 1830 and expenses 1831 for each month of the current fiscal year, together with a field to enter a description of the activities for the applicable month 1832. FIG. 18B shows an example of the 3rd month status report input form 1850 for the same matter that might be presented to the responsible user of the outside counsel. In this example, the form has a field to specify the current status 1851, fields to specify the estimates of exposure and recovery for the matter 1860-1863, fields to specify the estimated resolution of the matter 1870, 1871, a field to attach a file (such as a Microsoft Word document) that contains a case analysis for the matter 1880, and the budget displayed with a selection to confirm the budget 1890 or a link to update and correct the budget 1891. In other words, the data object which is in the form of a status report can change for each status report to display the required information that must be completed or updated at the time the status report is submitted. In some embodiments, the facility displays chevrons—such as those displayed near the identifiers for fields

1860-1863 and 1870-1871—that identify these fields as required. In some embodiments (not shown), the facility requires all of the fields in the status report. In some embodiments, where the status report is required for a company user, the company user must complete all required fields in the status report. In some embodiments (not shown) in which the status report is required for a company user, the company user must operate a confirmation control to confirm the accuracy and currentness of the information in all of the fields, or in all of the required fields. While various embodiments of a status report form are described above, those skilled in the art will appreciate that the facility may provide other fields for data in the status report form.

It will be understood by those skilled in the art that the above-described facility could be adopted or extended in various ways. For example, the facility may be used by a variety of different clients and outside or inside vendors. Additionally, the facility can require fields in response to a wide variety of events, observed by the facility in a wide variety of ways. While the foregoing description makes reference to preferred embodiments, the scope of the invention is defined solely by the claims that follow and the elements recited therein.

We claim:

1. A method in a computing system for collecting information relating to an engagement between a first organization and a second organization, comprising:
   recurringly, at intervals of a fixed length, for each of a plurality of information fields relating to the engagement;
      with the computing system, accessing an indication comprising a time-based condition under which receiving contents for the information field becomes required to perform a first process, wherein the computing system is configured to perform the first process for users other than at least one user responsible for entering the contents in the required information field independently of whether the contents for the information field are received,
      wherein when the condition is presently satisfied, the computing system requires receiving contents for the information field prior to performing the first process for at least one user of a plurality of users who is responsible for the contents for the information field, and
      wherein when the condition is presently not satisfied, the computing system does not require receiving contents for the information field to perform the first process for the plurality of users, so that the first process can be performed irrespective of whether contents for the information field have been provided;
   with the computing system, determining whether the time-based condition under which the information field becomes required is presently satisfied;
   when it is determined that the condition under which the information field becomes required is presently satisfied, with the computing system, identifying receiving contents for the information field as presently required;
   when it is determined that the condition under which the information field becomes required is presently not satisfied, with the computing system, identifying receiving contents for the information field as presently not required; and
   when receiving contents for the information field is presently required to perform the first process and contents for the information field have not been received, preventing performance of the first process by the at least one user responsible for the contents for the information field.

2. The method of claim 1, further comprising, for each information field identified as presently required:
   determining whether contents have been provided for the information field; and
   if contents have not been provided for the information field, recording data in the computing system identifying the information field as delinquent.

3. The method of claim 2, further comprising, for each information field identified as delinquent, identifying a user of the first organization to whom to identify the information field as delinquent.

4. The method of claim 2, further comprising:
   for each information identified as delinquent, identifying a second process relating to the engagement that is precluded in response to the delinquency of the information field identified as presently required; and
   when the at least one user attempts the second process relating to the engagement that is identified as precluded, preventing the completion of the attempted second process.

5. The method of claim 2 wherein an information field is identified as delinquent by providing for display to a first user affiliated with the first organization an indication that the information field is delinquent.

6. The method of claim 5 wherein the first user has primary responsibility for the provision of contents of the delinquent information field.

7. The method of claim 5 wherein a second user affiliated with the first organization has primary responsibility for the provision of contents of the delinquent information field.

8. The method of claim 5 wherein a second user affiliated with the second organization has primary responsibility for the provision of contents of the delinquent information field.

9. The method of claim 2 wherein a first user affiliated with the first organization has primary responsibility for the provision of contents of a delinquent information field, and wherein an information field is identified as delinquent by, in response to an attempt by a second user affiliated with the first organization to complete a distinguished process relating to the engagement:
   preventing the second user from completing the distinguished process; and
   providing for display to the second user a message identifying the delinquent information field and indicating that the distinguished process can only be completed once the first user has provided contents for the delinquent information field.

10. The method of claim 1 wherein the first organization is a provider of services to the second organization.

11. The method of claim 1 wherein the second organization is a provider of services to the first organization.

12. A computer-readable memory whose contents cause a computing system to perform a method for collecting information relating to an engagement between a first organization and a second organization, the computer-readable memory not being a transitory, propagating signal per se, the method comprising:
   periodically, at fixed intervals, for at least one of a plurality of information fields relating to the engagement:
      accessing an indication comprising a time-based condition under which receiving contents for the information field becomes required in order to perform a first process, wherein the computing system is configured to perform the first process for users other than at least one user responsible for entering the contents in the required information field independently of whether the contents for the information field are received;

determining whether the condition is presently satisfied; and when it is determined that the condition is presently satisfied, identifying the information field as presently required and requiring the contents for the information field to be received prior to performing the first process for at least one user of a plurality of users who is responsible for the contents for the information field;

for each information field of the plurality identified as presently required:

determining whether contents have been provided for the at least one information field; and if contents have not been provided for the at least one information field, identifying the information field as delinquent;

for each information field identified as delinquent:

in response to the delinquency of the information item, identifying at least one process relating to the engagement as precluded, wherein the computing system is configured to perform the process independently of whether the contents for the information field are received; and when the at least one user responsible for the contents for the information field attempts the at least one process relating to the engagement that is identified as precluded, preventing the performance of the at least one process.

13. The computer-readable memory of claim 12, the method further comprising, for each information identified as delinquent, identifying a user of the first organization to whom to identify the information field as delinquent.

14. The computer-readable memory of claim 12 wherein an information field is identified as delinquent by providing for display to a first user affiliated with the first organization an indication that the information field is delinquent.

15. The computer-readable memory of claim 14 wherein the first user has primary responsibility for the provision of contents of the delinquent information field.

16. The computer-readable memory of claim 14 wherein a second user affiliated with the first organization has primary responsibility for the provision of contents of the delinquent information field.

17. The computer-readable memory of claim 14 wherein a second user affiliated with the second organization has primary responsibility for the provision of contents of the delinquent information field.

18. The computer-readable memory of claim 12 wherein a first user affiliated with the first organization has primary responsibility for the provision of contents of a delinquent information field, and wherein an information field is identified as delinquent by, in response to an attempt by a second user affiliated with the first organization to complete a distinguished process relating to the engagement:

preventing the second user from completing the distinguished process; and providing for display to the second user a message identifying the delinquent information field and indicating that the distinguished process can only be completed once the first user has provided contents for the delinquent information field.

19. The computer-readable memory of claim 12 wherein the first organization is a provider of services to the second organization.

20. The computer-readable memory of claim 12 wherein the second organization is a provider of services to the first organization.

21. The computer-readable memory of claim 12 wherein a first condition under which a first information field becomes required is different from a second condition under which a second information field becomes required.

* * * * *

UNITED STATES PATENT AND TRADEMARK OFFICE
CERTIFICATE OF CORRECTION

PATENT NO.         : 9,767,435 B1
APPLICATION NO.    : 11/415361
DATED              : September 19, 2017
INVENTOR(S)        : Richard D. Boone et al.

It is certified that error appears in the above-identified patent and that said Letters Patent is hereby corrected as shown below:

In the Claims

At Column 17, Claim number 1, beginning on Line number 29 and ending on Line number 30, delete "engagement;" and replace with --engagement:--.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*